(12) United States Patent
Ojala et al.

(10) Patent No.: US 8,881,204 B2
(45) Date of Patent: Nov. 4, 2014

(54) METHOD FOR PROVIDING ACCESS TO MEDIA CONTENT THROUGH A SERVER

(75) Inventors: Juho Ojala, Helsinki (FI); Johan Wikman, Helsingfors (FI); Jukka K. Nurminen, Espoo (FI); Atte Lahtiranta, Espoo (FI)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 1263 days.

(21) Appl. No.: 12/204,076

(22) Filed: Sep. 4, 2008

(65) Prior Publication Data

US 2010/0058398 A1 Mar. 4, 2010

(51) Int. Cl.
| | |
|---|---|
| *H04N 7/18* | (2006.01) |
| *H04N 21/436* | (2011.01) |
| *H04N 21/25* | (2011.01) |
| *H04L 12/28* | (2006.01) |
| *H04N 21/414* | (2011.01) |
| *H04N 21/482* | (2011.01) |
| *H04N 21/442* | (2011.01) |
| *H04N 7/173* | (2011.01) |
| *H04N 21/2743* | (2011.01) |

(52) U.S. Cl.
CPC ..... *H04N 7/17318* (2013.01); *H04N 21/43615* (2013.01); *H04N 21/252* (2013.01); *H04L 12/2812* (2013.01); *H04N 21/41407* (2013.01); *H04N 21/4826* (2013.01); *H04N 21/44227* (2013.01); *H04L 12/2829* (2013.01); *H04N 21/2743* (2013.01)

USPC ............... 725/80; 725/81; 725/117; 709/204; 709/217; 709/223; 709/250

(58) Field of Classification Search
None
See application file for complete search history.

(56) References Cited

U.S. PATENT DOCUMENTS

| | | | | |
|---|---|---|---|---|
| 2003/0046097 | A1* | 3/2003 | LaSalle et al. | 705/1 |
| 2004/0267965 | A1* | 12/2004 | Vasudevan et al. | 709/250 |
| 2005/0114493 | A1* | 5/2005 | Mandato et al. | 709/223 |
| 2007/0136778 | A1* | 6/2007 | Birger et al. | 725/117 |
| 2008/0209522 | A1* | 8/2008 | Ephraim et al. | 726/4 |
| 2009/0265426 | A1* | 10/2009 | Svendsen et al. | 709/204 |
| 2010/0205276 | A1* | 8/2010 | Quintarelli | 709/217 |

* cited by examiner

*Primary Examiner* — Joshua Taylor

(57) ABSTRACT

A system for providing devices such as WCDs, televisions, stereos, video game systems, etc. access to media content through an entity such as a web server. In accordance with at least one embodiment, UPnP or DLNA compliant devices may utilize a user's home network to access a user's media library from on an online media service. The media service may provide a user interface to the device to enable the user to access his media library. The media may be stored on a networked storage device connected to the media service, on the user's network devices, on the user's WCD, etc. The media service may automatically query the user's WCD to determine the presence of other persons in his proximity, and determine their preferences. A customized media stream that is suitable for the whole group may be generated based at least in part on the combined preferences of the group.

13 Claims, 6 Drawing Sheets

METHOD FOR PROVIDING ACCESS TO MEDIA CONTENT THROUGH A SERVER

BACKGROUND

1. Field of Invention

Various embodiments of the present invention relate to providing access to data over a network, and more specifically to providing access to media files through an entity (e.g., a server).

2. Background

While wireless communication devices (WCDs) were perhaps viewed by many as a luxury when first introduced into the marketplace, they are today viewed by our society as very important, useful, and convenient tools. A large segment of society now carries their wireless communication devices with them wherever they go. These devices include, for example, mobile telephones, Personal Digital Assistants (PDAs), laptop/notebook computers, and the like. The popularity of these devices and the ability to communicate wirelessly has spawned a multitude of new wireless systems, devices, protocols, etc. Consumer demand for advanced wireless functions and capabilities has also fueled a wide range of technological advances in the utility and capabilities of wireless devices. Wireless communication devices not only allow voice communication, but also facilitate messaging, multimedia communications, e-mail, Internet browsing, and access to a wide range of wireless applications and services.

The desire for users to employ wireless devices in multiple settings continues to keep pace with new communication enhancements incorporated in these devices. For example, WCDs have recently become popular as multimedia devices being used for listening to music, browsing the web, watching videos on sites such as YouTube™, etc. Moreover, this demonstrated ability to mobilize resources that were previously thought only to be available through stationary devices has created the desire to tie other resources to wireless apparatuses so that they may utilize, and/or have access to, these resources regardless of the location. These resources may include various devices like stationary computers, televisions, cameras, stereo equipment, video game systems, etc.

However, no effective solution currently exists for providing these devices access to media content (e.g., music, movies, pictures, etc.) through a web service. One need has been to provide users a satisfactory and unique user experience when providing media services.

SUMMARY

Various embodiments of the present invention may include at least a method, apparatus, system and computer program for providing a multitude of devices such as WCDs, televisions, stereos, video game systems, etc. access to media content through an entity such as a web server.

In accordance with at least one embodiment of the present invention, UPnP or DLNA compliant devices may utilize a user's home network to access a user's media library from on an online media service. The media service may provide a user interface to the device to enable the user to access his media library. The media may be stored on a networked storage device connected to the media service, on the user's network devices, on the user's WCD, etc.

In accordance with an exemplary embodiment, the media service may provide media content based on one or more persons in proximity to the user. The user may send his own preferences and preferences of the one or more persons present to the media service, and the media service may generate a customized stream of media based at least in part on the preferences. Alternatively, the media service may automatically query the user's WCD to determine the presence of other persons in his proximity. The media service may determine the preferences of the persons based at least in part on their identification and on their past media consumption. The media service may then generate a customized stream of media that is suitable for the whole group based at least in part on the preferences of the group.

DESCRIPTION OF DRAWINGS

The disclosure will be further understood from the following description of various exemplary embodiments, taken in conjunction with appended drawings, in which.

DESCRIPTION OF EXEMPLARY EMBODIMENTS

While the disclosure has been described below in a multitude of exemplary embodiments, various changes can be made therein without departing from the spirit and scope of the invention, as described in the appended claims.

I. Wireless Communication Over Different Communication Networks.

Figure 1:
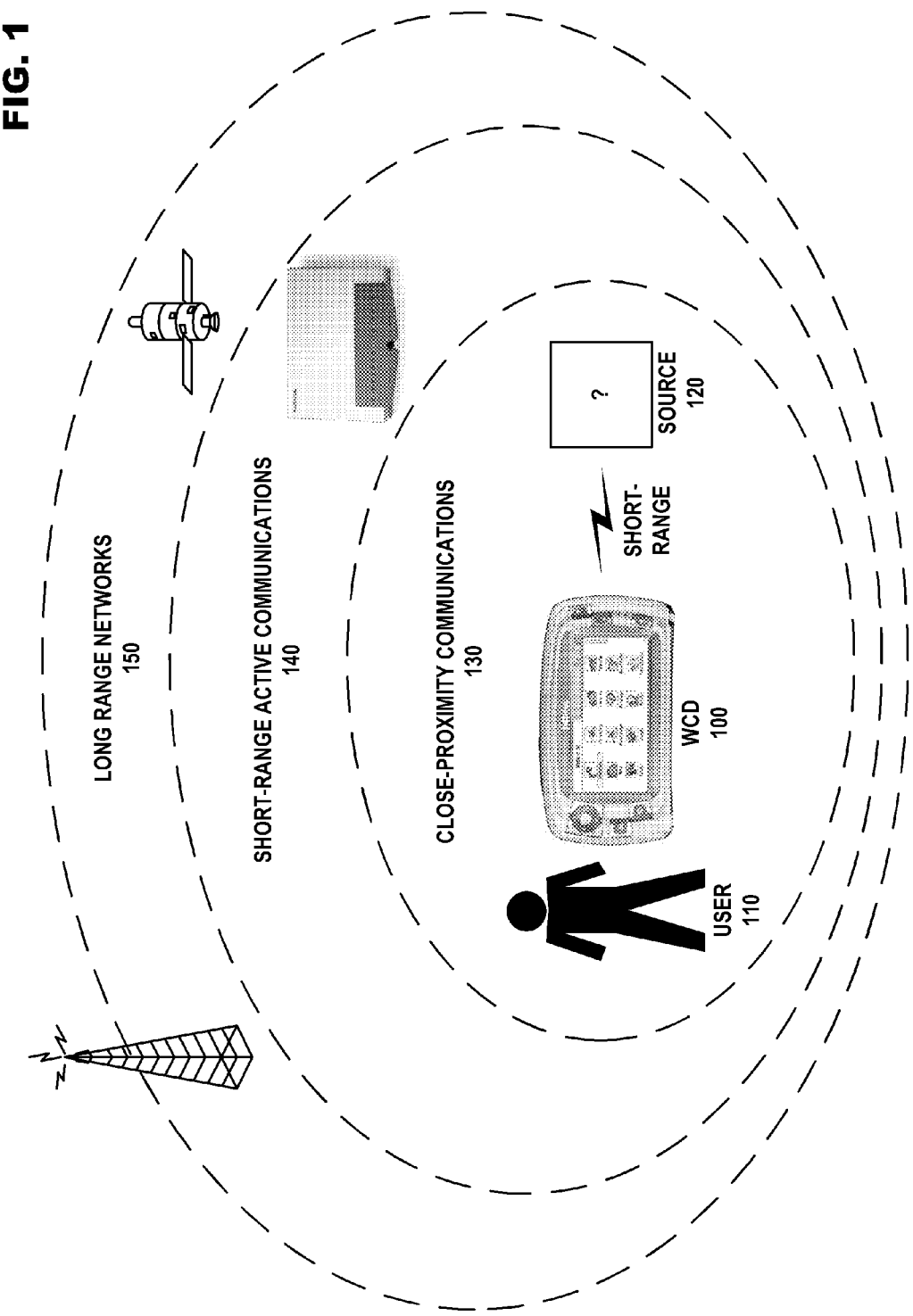
FIG. 1 discloses an exemplary wireless operational environment, including wireless communication mediums of different effective range.

A WCD may both transmit and receive information over a wide array of wireless communication networks, each with different speed, range, quality (error correction), security (encoding), etc. characteristics. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communications (NFC) 130 include various transponder-type interactions wherein normally only the scanning device requires its own power source. WCD 100 scans source 120 via short-range communication. A transponder in source 120 may use the energy and/or clock signal contained within the scanning signal, as in the case of RFID communication, to respond with data stored in the transponder. These types of technologies usually have an effective transmission range of a few inches to a few feet, and may be able to deliver stored data in amounts from 96 bits to over a megabit or 125 Kbytes relatively quickly. These characteristics make these technologies well suited for identification purposes, such as to receive an account number for a public transportation provider, a key code for an automatic door lock, an account number for a credit or debit transaction, etc.

The transmission range between two devices may be extended if both devices are capable of performing powered communications. Short-range active communications 140 includes devices wherein the sending and receiving devices are both active. An exemplary situation would include user 110 coming within effective transmission range of a Bluetooth™, wireless local area network (WLAN), ultra wideband (UWB), wireless universal serial bus (WUSB), Wibree, etc. access point. In the case of Bluetooth™, a network may automatically be established to transmit information to WCD 100 possessed by user 110. This data may include information of an informative, educational or entertaining nature. The amount of information to be conveyed may be unlimited. The transmission range of these networks depends on the technology, and may be from 32 ft. to over 300 ft. with additional power boosting.

Long-range networks 150 are used to give virtually uninterrupted coverage to WCD 100. Land-based repeaters or satellites are used to deliver communication coverage worldwide.

II. Wireless Communication Device

As previously described, the present invention may be utilized with a variety of wireless communication equipment.

Figure 2:
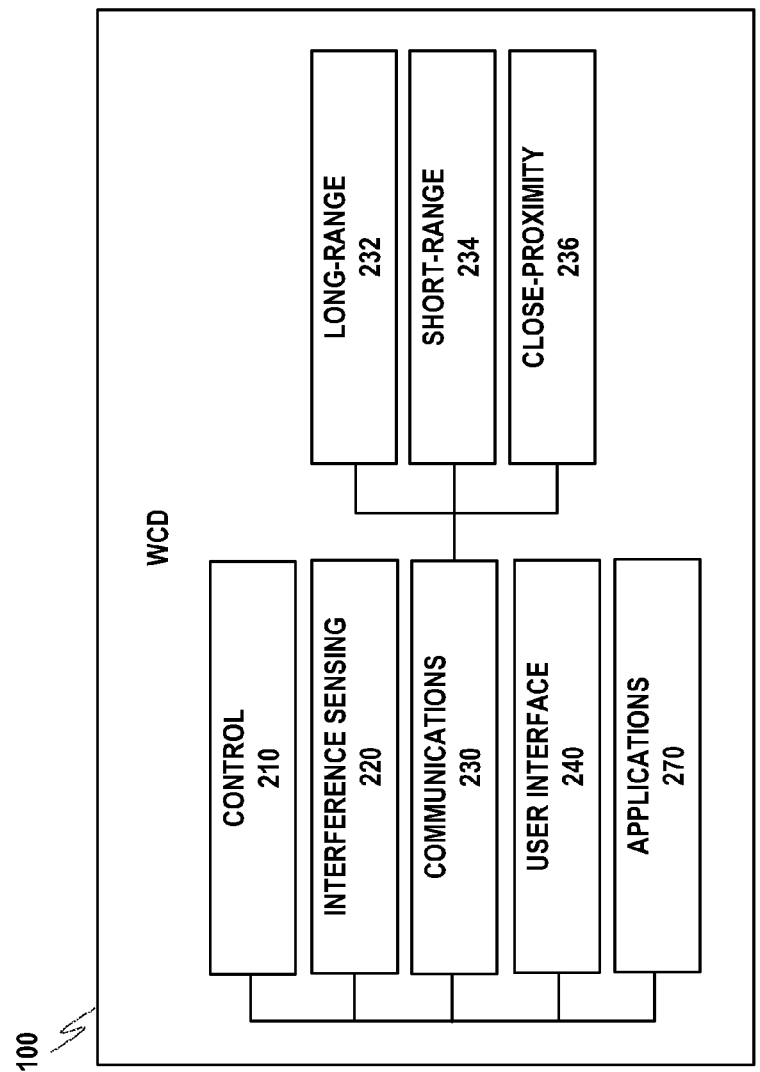
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs and in response may issue control commands to the other modules in WCD 100.

Communications module 230 incorporates all of the communications aspects of WCD 100. As shown in FIG. 2, communications module 230 includes, for example, long-range communications module 232, short-range communications module 234 and machine-readable data module 236. Communications module 230 utilizes at least these sub-modules to receive a multitude of different types of communication from both local and long distance sources, and to transmit data to recipient devices within the broadcast range of WCD 100. Communications module 230 may be triggered by control module 210 or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
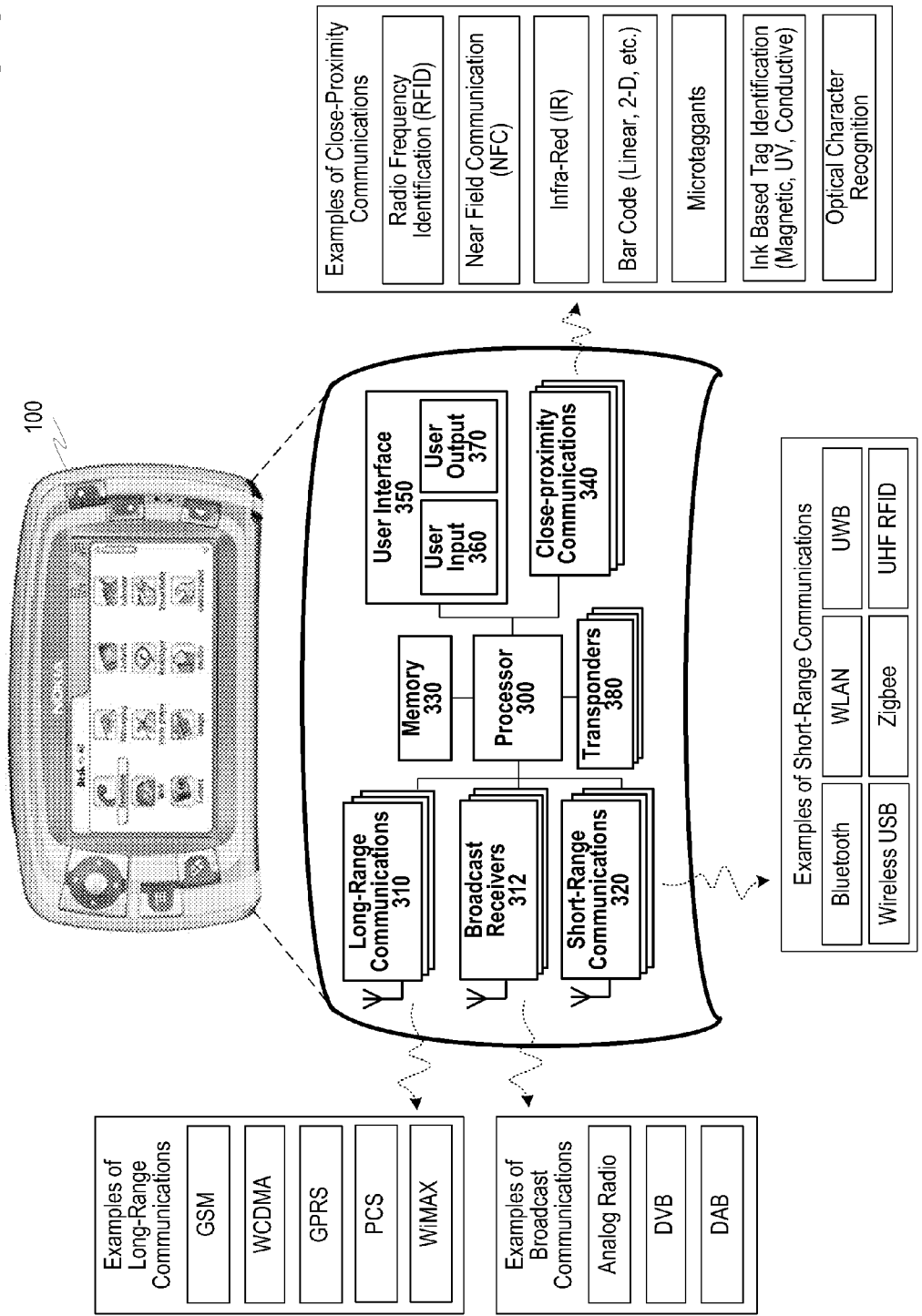
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to communications sections 310, 312, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

Memory 330 may also encompass different forms of removable media that may be accessed by resources within WCD 100. A device such as WCD 100 may be configured to accept different forms of removable media, such as flash memory, CD-ROM, DVD-ROM, etc. Once coupled to, or inserted within, WCD 100, processor 300 may trigger a read/write device to access this removable media in order to load program information and/or other forms of data into memory integrated within WCD 100.

The software components stored by memory 330 include instructions that can be executed by processor 300. Various types of software components may be stored in memory 330. For instance, memory 330 may store software components that control the operation of communication sections 310, 312, 320 and 340. Memory 330 may also store software components including a firewall, a service guide manager, a bookmark database, user interface manager, and any communications utilities modules desirable to support WCD 100.

Long-range communications 310 performs functions related to the exchange of information over large geographic areas (such as cellular networks) via an antenna. These communication methods include technologies from 1G to 3G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages. As disclosed in FIG. 3, Long-range communications 310 may be composed of one or more subsystems supporting various long-range communications mediums. These subsystems may, for example, be radio modems enabled for various types of long-range wireless communication.

As a subset of long-range communications 310, or alternatively operating as an independent module separately connected to processor 300, broadcast receivers 312 allows WCD 100 to receive transmission messages via mediums such as Analog Radio, Digital Video Broadcast for Handheld Devices (DVB-H), Digital Audio Broadcasting (DAB), etc. These transmissions may be encoded so that designated receiving devices may access the transmission content, and may contain text, audio or video information. In at least one example, WCD 100 may receive these transmissions and use information contained within the transmission signal to determine if the device is permitted to view the received content. As in the case of long-range communications 310, broadcast receivers 312 may be comprised of one or more radio modems utilized to receive a variety of broadcast information.

Short-range communications 320 is responsible for functions involving the exchange of information across short-range wireless networks. As described above and depicted in FIG. 3, examples of such short-range communications 320 are not limited to Bluetooth™, WLAN, UWB, Zigbee, UHF RFID, Wibree and Wireless USB connections. Accordingly, short-range communications 320 performs functions related to the establishment of short-range connections, as well as processing related to the transmission and reception of information via such connections. Short-range communications 320 may be composed of one or more subsystems made up of, for example, various radio modems employed to communicate via the previously indicated assortment of short range wireless mediums.

Short-range input device 340, also depicted in FIG. 3, may provide functionality related to the short-range scanning of machine-readable data (e.g., for NFC). For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include a multitude of optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This may be a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Protocol (WAP), Hypertext Markup Language (HTML) variants like Compact HTML (CHTML), etc.

III. Universal Plug and Play.

Universal Plug and Play (UPnP) is a networking architecture that provides compatibility among networking equipment, software and peripherals of vendors who belong to the Universal Plug and Play Forum. A UPnP control point is a control device that is capable of discovering and controlling client devices in a network through a Web or program interface. The UPnP protocol includes the steps of discovery, description, control, event notification, and presentation.

The first step in UPnP networking is discovery, based on a previously known IP address of a client device. When a device is added to the network, the UPnP discovery protocol allows that device to advertise its services to control points on the network. Similarly, when a control point is added to the network, the UPnP discovery protocol allows that control point to search for devices of interest on the network. The fundamental exchange in both cases is a discovery message containing information about the device or one of its services, for example, its type, identifier, and a pointer to more detailed information. The UPnP discovery protocol is based on the Simple Service Discovery Protocol (SSDP).

The next step in UPnP networking is description. After a control point has discovered a device, the control point retrieves the device's description from a URL provided by the device in the discovery message. For each service, the description includes a list of the commands, or actions, to which the service responds.

The Control, Event notification, and Presentation steps of UPnP deal with real-time operation of the client devices in the network using the control point.

IV. Exemplary Operation of a Wireless Communication Device.

Figure 4:
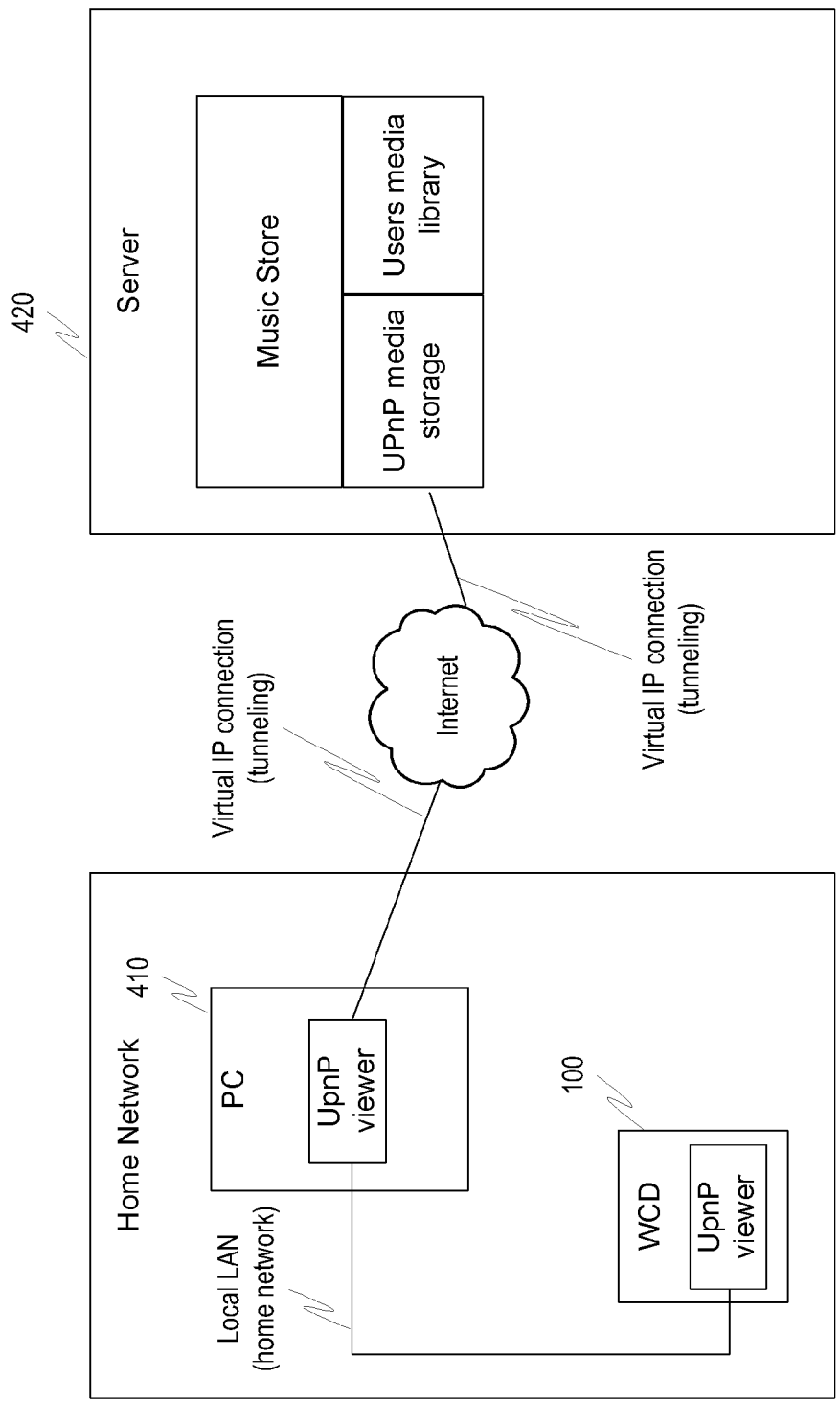
FIG. 4 discloses an exemplary network environment in accordance with at least one embodiment of the present invention.

FIG. 4 discloses an exemplary network environment where a user's home network utilizes an online music store to present the user's media library in accordance with at least one embodiment of the present invention. A server 420 may comprise an online media service such as Ovi.com, iTunes™, YouTube™, etc., and may include e.g., a UPnP compliant network storage device which may store a registered user's media library including music, pictures, movies, etc. WCD 100 running a UPnP application may, through the UPnP application, be granted access to the online media library via a device, such as a PC 410 connected to the home network. It should be noted that UPnP is but one example of a connection protocol. For example, WCD 100 may connect to a device on the home network using a proprietary protocol, or may use a TCP/IP/UDP based protocol which the home network device uses when it is connected with the network server. Additionally, there may be a wireless LAN or a wired LAN to which the home network devices are connected, and the protocol they use may be other than UPnP.

WCD 100 may be connected to PC 410 through the home network (LAN). Alternatively, if WCD 100 is not physically part of the home network, it may remotely connect to the home network using an application. WCD 100 may then allow a registered user to log into his/her account with the online media service to access the media library through PC 410. PC 410 may use a virtual IP connection (tunneling) to connect to the network storage device storing the media library. In accordance with an exemplary embodiment, server 420 may also be running an application to make the network storage device appear to be part of the home network.

The network environment shown in FIG. 4 is but one example of connecting to the online media service. WCD 100 may connect to a multitude of devices such as televisions, stereo systems, etc through a number of connection protocols as described above. For example, WCD 100 may connect to a UPnP compliant television, which in turn connects to the media service. Once the user logs in to the media service, the user may access the media library and view pictures, videos, etc. from his media library on the television. Additionally, in accordance with an exemplary embodiment, WCD 100 may connect to the online media service through a number of devices, as described above, to upload media stored on the WCD 100 to the user's media library on the online media service.

In accordance with an exemplary embodiment, WCD 100 may act as a remote controller of a UPnP or DLNA compliant device. For example, WCD 100 may connect to a UPnP or DLNA compliant stereo system and instruct the stereo system to access and play a song from the user's media library on the online media service. In one embodiment, the WCD 100 may use the user interface of the media service (see e.g. http://music.nokia.co.uk) and register to that service and download media content. The web user interface of the online media service may be made of tiles. If the WCD 100 has a smaller display than PC 410, the user interface in WCD 100 may have tiles which have been sorted from the user interface of PC 410, and may be shown in tab or sequential order in WCD 100. In accordance with the exemplary embodiment, this enables the user interface displayed on WCD 100 to have a similar appearance portion by portion (area by area) as the user interface of the online media service displayed on PC 410.

In accordance with an exemplary embodiment the tab which is first shown to the user is the one which has the playlist of the user, e.g. the media the user has bought from the music store. However, other media may also be included into the playlist. Other tabs may include portions of the user interface of the music store in sequential order e.g. in the second tab the new media to buy is shown etc. In accordance with an exemplary embodiment, WCD 100 may select the media device (e.g., stereo, television, etc.) by which the media is to be consumed (e.g., played, displayed, etc.). For example, WCD 100 may suggest, as the first device to be used for consumption of media, the device which is closest to WCD 100. In accordance with an exemplary embodiment, the media may have characteristics, e.g. type of file which may require WCD 100 to select the most appropriate device. For example, in the case of media being a music file, the preferred device may be a stereo.

In accordance with an exemplary embodiment, the device may be selected based on past used device information. For example, if the user has more often selected a specific device for playing music, then the user may be recommended to select or WCD 100 may automatically select that device again to play music. The past used device information may be collected either by WCD 100, or the information may be sent to the online media service. In accordance with an exemplary embodiment, the user may have a look-up table of the devices to be selected or used for consumption of media. The order of the devices in the look-up table may depend on the past selections depending on context (location (geographical coordinates), time, past selected device in same situation, etc.).

In accordance with an exemplary embodiment, the initiating device is not limited to a wireless device such as WCD 100, but may, for example be a UPnP or DLNA compliant video game console such as a Playstation™. For example, a Playstation™ may connect to the online media service through the user's home network similar to the way WCD 100 connects to the media service as previously described. Once connected and logged into the user's account, the Playstation™ may access the user's media library to, for example, display pictures from the user's photo library stored on the network storage device of the online media service.

In accordance with an exemplary embodiment, WCD 100 may connect to the online media service through a PC or television, and stream media such as music or videos for playback on the television or PC. Alternatively or in addition, the media consumption (e.g., playback of videos or music, viewing of pictures, etc.) may occur on or through WCD 100. For example, a user may log in to the service account using WCD 100. The service may then deliver a media stream or media files, such as videos, podcasts, music, electronic books, movies and/or the like, to the WCD 100 that was used when logging in to the service.

Figure 5:
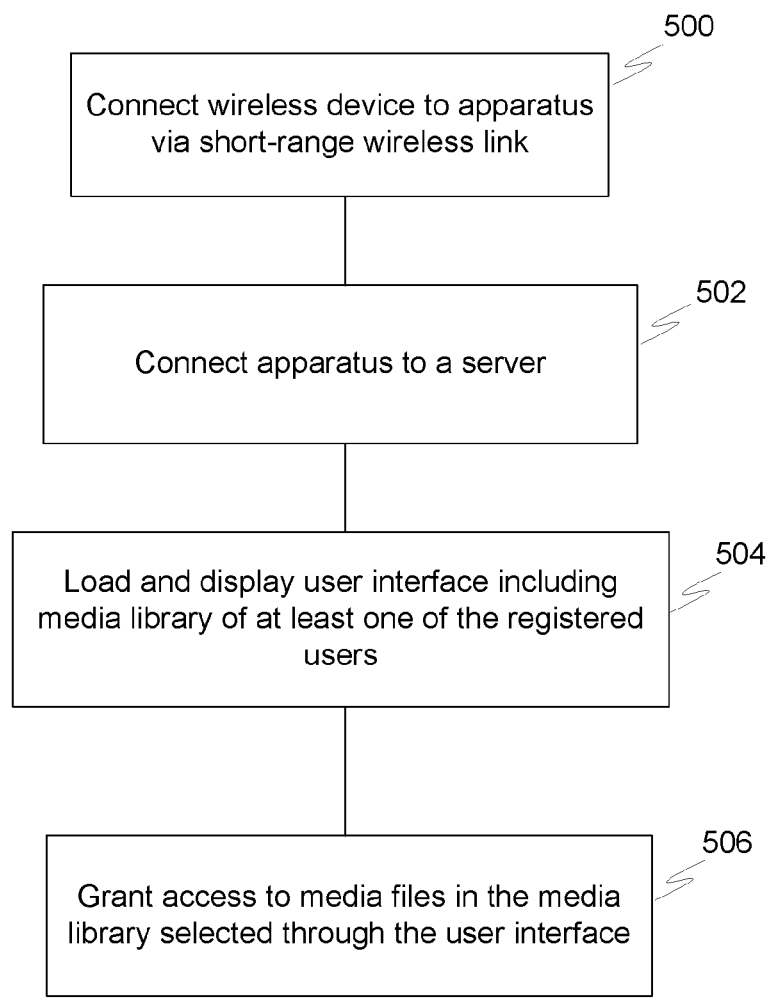
FIG. 5 discloses a flowchart for an exemplary communication process in accordance with at least one embodiment of the present invention.

In accordance with an exemplary embodiment, the streaming of music or videos may be customized based at least in part on the persons present. FIG. 5 discloses a flowchart for an exemplary communication process in accordance with at least one embodiment of the present invention. WCD 100 may connect to a UPnP or DLNA compliant apparatus such as a PC, television, etc. through a short-range wireless link such as Wi-Fi (step 500). In step 502 the apparatus may be connected to an entity (e.g., a server) including a media service. Once connected to the entity, the user may log into his account with the media service. Once logged in, a user interface supplied by the entity may be loaded and displayed on the apparatus (step 504). The user interface may include file identification information corresponding to the media files in the user's media library or collection. When the user selects a media file, through the user interface, from the media library the apparatus is granted access to the media file and the media file may be processed on the apparatus for playback, display, etc. (step 506).

Figure 6:
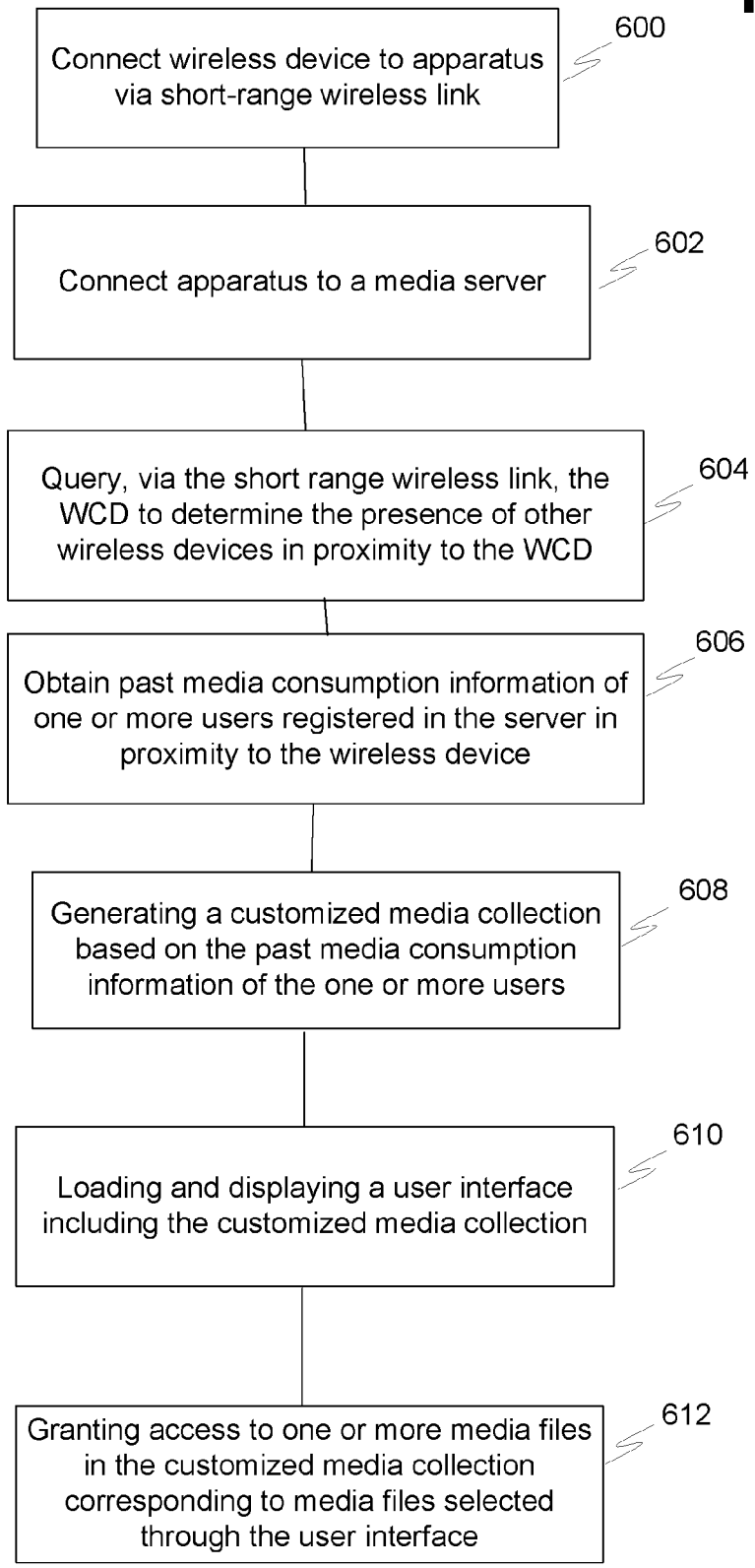
FIG. 6 discloses a flowchart for an exemplary communication process in accordance with at least one embodiment of the present invention.

In accordance with an exemplary embodiment, the media service may customize the media available to the user based on persons in proximity to the user. FIG. 6 discloses a process for customizing access to media content in accordance with an exemplary embodiment of the present invention. Steps 600 and 602 describe, as previously described in the description of FIG. 5, how WCD 100 may connect to an apparatus via a short-range wireless link, and how the apparatus may inturn be connected to an entity such as a server including a media service. The user may log into the media service such as Ovi.com to, for example, watch videos. Based on the log in information, the service may determine the identity of the user. Additionally, the service may, via the short-range wireless link, query WCD 100 to determine the presence of other wireless devices in proximity to WCD 100 (step 604). WCD 100 may be running a mobile web server. The mobile web server may include a service which may return e.g., a list of Bluetooth Device Addresses (BDAs) of other wireless devices near WCD 100. Once BDAs of nearby devices are determined, the BDAs may be mapped to the corresponding identification information of users of those devices. A mapping service which registers BDAs with the corresponding identification information may be used to determine identification information of the persons in proximity to the user. The registration of BDAs may be done without explicit user intervention by an application running on the wireless device. The application may, for example, be an Ovi related client application. The identification information may be expressed in a number of ways that can be utilized by the media service.

In accordance with an exemplary embodiment, once the identification information corresponding to all the persons (registered with the media service) in proximity to WCD 100 is determined, the media service may determine past media consumption information (e.g., preferences) of the persons (step 606). The preferences may be determined based on, for example, other videos that they have watched and rated. Based on the preferences, the media service may generate a customized media collection (e.g., a stream) for this particular group of people (step 608). The customized media collection may then be displayed through a user interface (step 610) and the user may be given access to media files selected through the user interface (step 612) similar to steps 504 and 506 in FIG. 5.

To illustrate by way of example, Joe, Mary and Bob want to watch videos together on Joe's PC. Joe's UPnP compliant mobile phone connects to his PC over his home network. Joe then logs in to a media service such as Ovi.com. Once Joe logs in to his Ovi account, the service queries Joe's mobile phone to determine the presence of other persons in Joe's proximity. Once the media service identifies the persons in Joe's proximity, the media service then determines the preferences of each individual based on the videos they have previously watched and rated. The media service then generates a customized stream of videos according to the combined preferences of Joe, Mary and Bob.

In an exemplary embodiment, alternatively or in addition to inquiring or receiving BDAs of other devices in proximity, WCD 100 may inquire or receive log-on information of users in proximity. For example, Joe's WCD may receive the log-on information to Mary's and Bob's accounts from Mary's and Bob's WCDs, and may log on to their account at the same time. The log-on information received from Mary's and Bob's devices may be in encrypted form. Alternatively or in addition, users may define, for example in the service, content that may be publicly accessed, requiring no log-on information. In that case, the user's content may be searched for example, using a service user name and/or the like. The users may define, for example, that some content is for private viewing/utilization and may not be accessed by other users, or may be accessed only with the user's permission or by other users trusted by the user, and that some content is publicly accessible.

For example, in a shared music listening event, Joe, Mary and Bob, may also want to access music from each of their online music service/store accounts without separately having to log on to each of their accounts and selecting what to listen to. In an exemplary embodiment, Joe's WCD may detect the proximity of Mary and Bob (e.g. by detecting the presence of WCDs belonging to Mary and Bob, and/or by receiving the log-on information of Mary and Bob) and the service may enable the sharing of media libraries of Joe, Mary and Bob at the same time. The service may then, for example, analyze the media content of the users' libraries and utilize the libraries to create a combined playlist or stream media, such as music, from the libraries. The service may analyze, for example, the genre/artist/year and/or the like of the media files, such as music files, and create a playlist that would contain similar music as the users' media libraries.

Alternatively, or in addition, the service may sequentially stream/deliver media files from the users' accounts to the device on which the users are gathered to consume the media. In an exemplary embodiment, Joe, Mary and Bob, may be watching videos on Joe's TV. They may first watch videos received from Joe's online service account and switch to watch videos from Mary's account after awhile. The account switching may happen automatically, e.g. after all videos/media files from Joe's account have been watched/consumed, and/or manually, for example, by giving an indication on some of the WCDs used to access or control the media consumption event. For example, the WCDs of Joe, Mary and Bob, may be running an application to control the shared consumption event. The application may also display information, such as which online/offline media library is currently being accessed, and in the user interface the user may change the currently accessed library. For example, Joe may select the media library of Mary, in which case the videos/media files from Mary's online account would be accessed/consumed.

It should be noted that utilizing BDAs is but one way of detecting persons in proximity of a WCD. In accordance with an exemplary embodiment, a group of people who are connected to the same WLAN base station may be considered to be in proximity of a WCD. Alternatively, a radio based positioning system, may be used to determine the location of persons (their wireless devices), and used for determining their proximity from each other.

Additionally, the use of a mobile web server is but one way of retrieving BDAs of nearby devices. In accordance with an exemplary embodiment, a customized SMS message may be sent by the media service to a WCD, in which a plug-in may scan for nearby BDAs and send back the results in an SMS, without any explicit user intervention. Alternatively, a client application running on a WCD, may autonomously scan for, and send a list of nearby BDAs when media is being consumed (e.g., music being played, videos being watched, etc.) to the media service using the connection previously described.

In accordance with an exemplary embodiment, the media service may generate a customized stream based on context or environment. For example, in a group video watching session, such as the one described above, the media service may select a playlist of videos that most of them have never seen or select videos that one or two of the participants have previously seen and liked (gave it a high rating). Another example would be a restaurant or party atmosphere where the media service may generate a playlist of music that most people don't dislike.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

What is claimed:

1. An apparatus comprising:
   a storage device configured to store information, including media files, corresponding to one or more users registered with the apparatus;
   a processor operably connected to the storage device, the processor configured to:
   allow communication between the apparatus and a second apparatus associated with one registered user of the one or more users registered with the apparatus;
   query the second apparatus to determine the presence of other potential registered users within short-range communication with the second apparatus;
   based on the determination that one or more potential users are within short-range communication with the second apparatus,
   receive identification information from the second apparatus based on the query, the identification information associated with the other potential registered users within short-range communication with the second apparatus;
   based on the identification information received from the second apparatus, determine which of the potential registered users are actually registered users of the apparatus; and
   grant access to the user of the second apparatus to one or more media files, stored on the apparatus, associated with the other actual registered users within short-range communication with the second apparatus.

2. The apparatus of claim 1, wherein the identification information includes user log-on information.

3. The apparatus of claim 1, wherein the processor grants access to only a subset of media files associated with the other registered users.

4. The apparatus of claim 3, wherein the processor grants access to media files defined as public.

5. The apparatus of claim 1, wherein the second apparatus is a UPnP or DLNA compliant device.

6. The apparatus of claim 1, wherein the processor further grants the other actual registered users access to one or more media files associated with the user of the second apparatus.

7. The apparatus of claim 1, wherein the granted access is streaming.

8. A method for providing access to media content on a storage device, the method comprising:
   allowing a connection to the storage device, which is configured to store media files, from a second apparatus associated with one registered user of the storage device;
   querying the second apparatus to determine the presence of other potential registered users within short-range communication with the second apparatus;
   based on the determination that one or more potential users are within short-range communication with the second apparatus,
   receiving identification information from the second apparatus based on the query, the identification information associated with the other potential registered users within short-range communication with the second apparatus;
   based on the identification information received from the second apparatus, determining which of the potential registered users are actually registered users of the storage device; and
   granting access to the user of the second apparatus to one or more media files, stored on the apparatus, associated with the other actual registered users within short-range communication with the second apparatus.

9. The method of claim 8, wherein the identification information includes user log-on information.

10. The method of claim 8, wherein the user of the second device is granted access to only a subset of media files associated with the other registered users.

11. The method of claim 10, wherein the subset of media files are defined as public.

12. The method of claim 8, wherein the second apparatus is a UPnP or DLNA compliant device.

13. The method of claim 8, further comprising granting the other actual registered users access to one or more media files associated with the user of the second apparatus.

* * * * *